US005722854A

United States Patent [19]
Geisler

[11] Patent Number: 5,722,854
[45] Date of Patent: Mar. 3, 1998

[54] PROTECTIVE COVERING SYSTEM FOR TRAILER LIGHT CONNECTORS

[76] Inventor: Steve C. Geisler, 122 Cobblestone La., Idaho Falls, Id. 83404

[21] Appl. No.: 499,563

[22] Filed: Jul. 7, 1995

[51] Int. Cl.⁶ .................................................. H01R 13/60
[52] U.S. Cl. .............................. 439/528; 439/34; 439/148
[58] Field of Search .................................. 439/528, 501, 439/35, 34, 134, 135, 142, 148

[56] References Cited

U.S. PATENT DOCUMENTS

| | | |
|---|---|---|
| 3,239,791 | 3/1966 | Fyrk . |
| 4,061,407 | 12/1977 | Snow . |
| 4,154,495 | 5/1979 | Crewse . |
| 4,312,553 | 1/1982 | Lyckesjo . |
| 4,679,873 | 7/1987 | Brackett, Jr. ............... 439/134 OR |
| 4,707,043 | 11/1987 | Reed ............................... 439/148 X |
| 4,738,641 | 4/1988 | Eversole, Jr. ...................... 439/528 |
| 4,829,223 | 5/1989 | Broberg et al. ................. 439/34 X |
| 4,940,427 | 7/1990 | Pearson ............................. 439/34 |
| 5,129,828 | 7/1992 | Bass .................................. 439/35 |
| 5,236,369 | 8/1993 | Beach et al. ................. 439/148 OR |
| 5,368,500 | 11/1994 | Dedering ......................... 439/367 |
| 5,378,163 | 1/1995 | Gladura et al. ............. 439/134 OR |
| 5,380,209 | 1/1995 | Converse ........................... 439/35 |

Primary Examiner—P. Austin Bradley
Assistant Examiner—Daniel Wittels
Attorney, Agent, or Firm—Robert A. Huntsman

[57] ABSTRACT

A protective covering system for trailer light connectors which will protect the trailer light connectors from exposure to rain, mud, dirt, road grime, and other adverse environmental conditions. The protective covering system is characterized by a body, a cap, and an optional holder. The body has a lower flexible portion with a slit for easily attaching and detaching the trailer light protective coveting system to the trailer, vehicle, or wiring harness such that the protective covering system can be covered by the cap when not in use. This will keep the inside of the protective covering system from being contaminated and allow it to be readily available for protecting the connectors on the trailer.

11 Claims, 3 Drawing Sheets

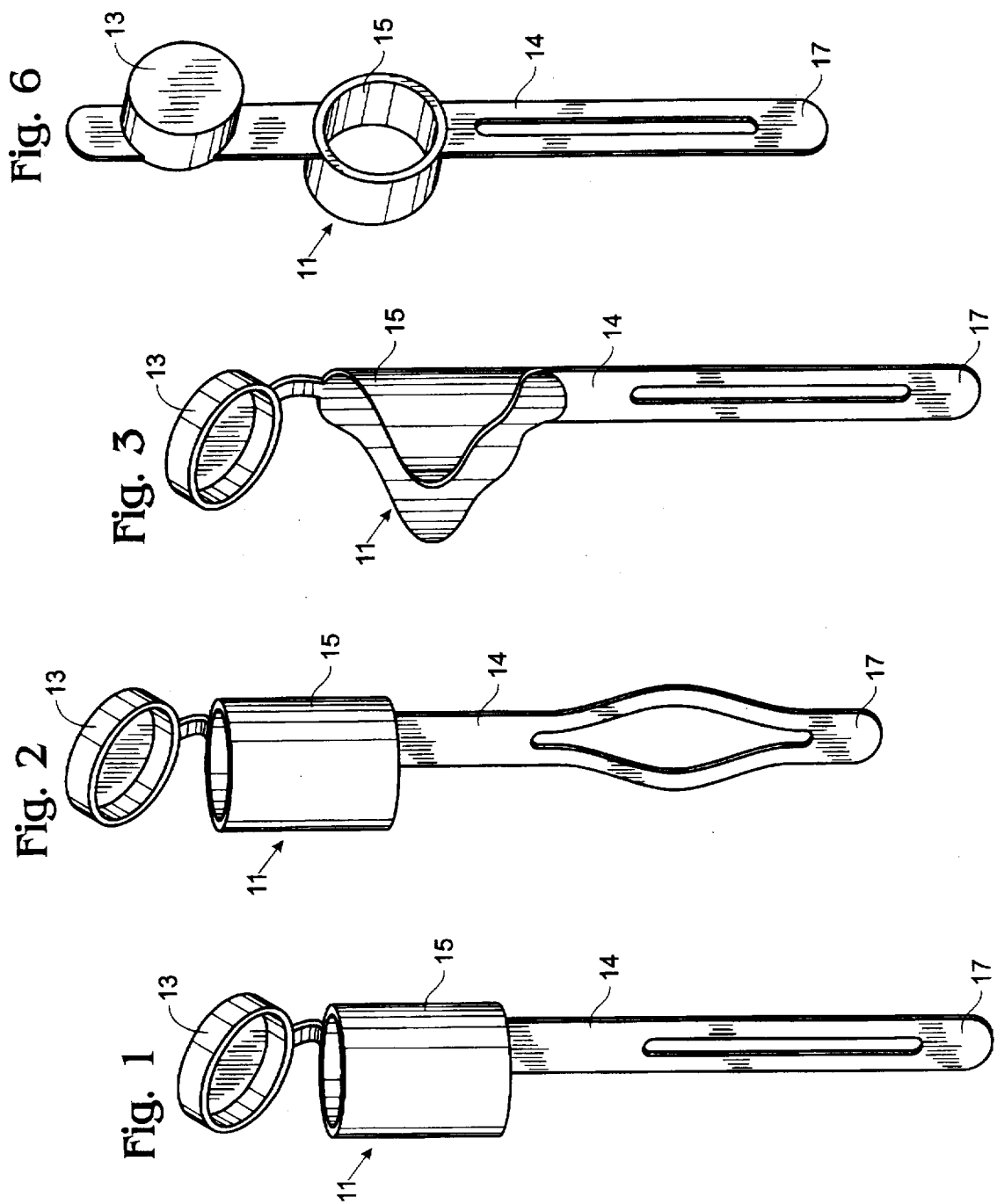

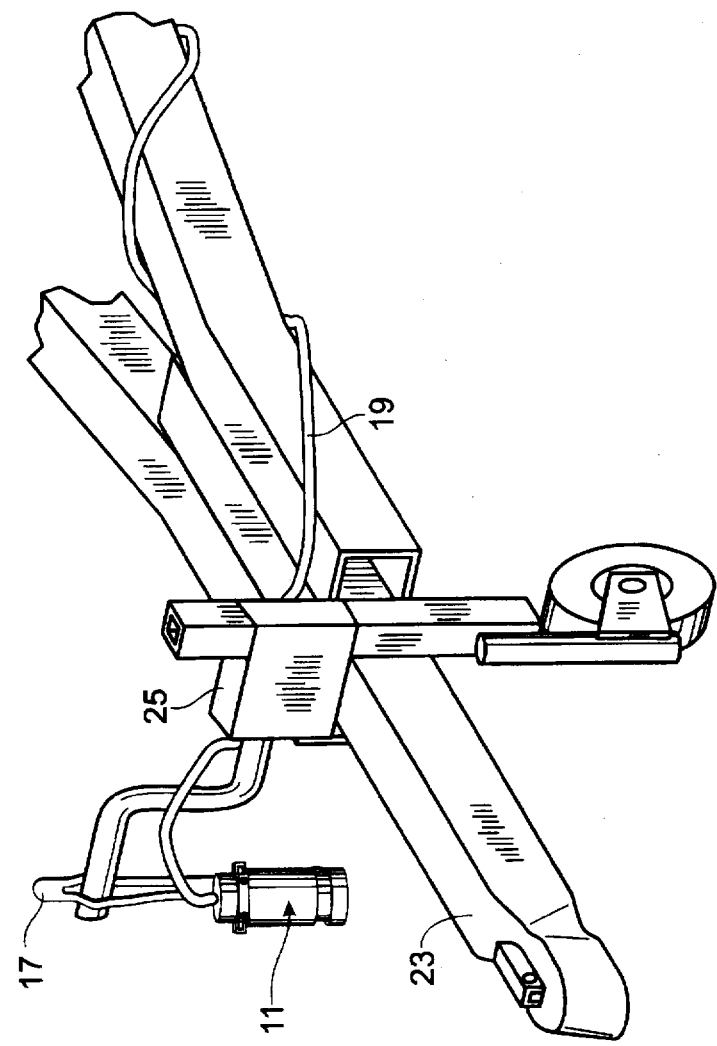
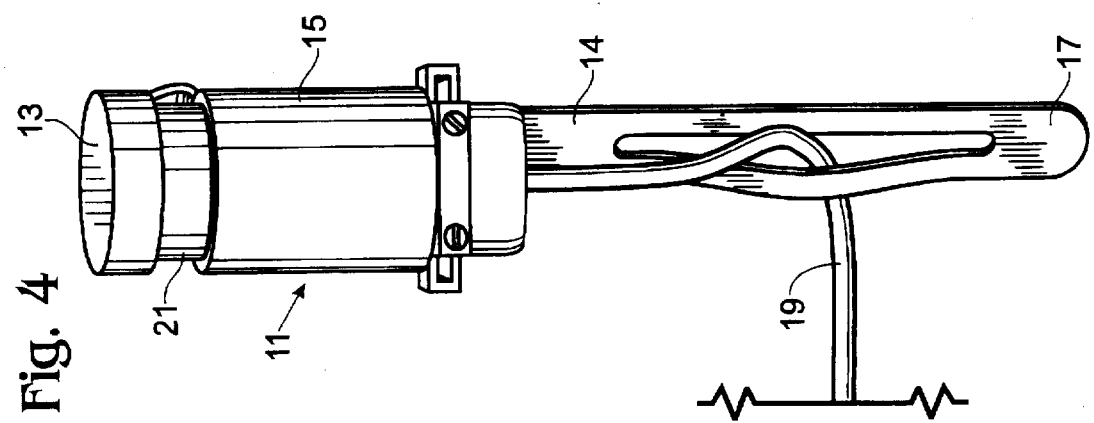

PROTECTIVE COVERING SYSTEM FOR TRAILER LIGHT CONNECTORS

BACKGROUND

This invention relates to trailer light connectors used to electrically connect lights of a towed trailer to the electrical system of a towing vehicle, and more particularly to a system that protects trailer light connectors from damage.

Cars, trucks and other vehicles are frequently used to pull trailers of various descriptions and it is therefore necessary for safety purposes to electrically connect the brake lights, turn signal indicators, back up lights, running lights, and related apparatus of the towing vehicle with corresponding lights on the trailer or other towed vehicle. Various types of connecting systems are used to achieve this purpose. A typical system consists of a multi-contact connector on a multi-wired electrical wiring harness attached to the trailer and a mated corresponding connector directly mounted on the towing vehicle. One variation consists of the converse where one connector is directly mounted on the trailer and the towing vehicle, rather than the trailer, has a mating connector attached to the end of an electrical wiring harness. Another variation of a connecting system consists of two mated connectors, each of which is attached to the towing vehicle and the trailer respectively by a wiring harness.

Attempts have been made to minimize or eliminate damage to the connectors, include wrapping the unprotected connector and the associated wiring harness around the vehicle trailer hitch or otherwise shortening the length of the wiring harness to prevent the connector from being dragged on the ground or coated with undesirable road elements. Such systems require complicated mechanisms and leave the unused connector uncovered and exposed to the elements.

The connectors, when disconnected, are easily contaminated with dirt and soil from at least two sources. First, since the wiring harness connecting the connector to the trailer needs to be both flexible and long enough to reach a variety of possible towing vehicles, the wiring harness and the associated connector tends to drop on the ground when disconnected, causing the connector's electrical contacts to get contaminated with dirt, mud and road grime and other environmental contaminants. In addition, rain water, dust, and other environmental contaminants can adversely affect the ability of the connector to make the required electrical connection between the trailer lights and the towing vehicle.

The wiring harness and the attached connector often dangle and drop to the ground when the trailer is idle and drag on the ground when the trailer is moved without the use of a towing vehicle. In some situations, such as in certain agricultural uses, the trailer will be towed without connecting the lights, leaving the connector exposed to severe contamination and other damage. Even when the connector is attached to a towing vehicle, there is often extra unused length in the wiring harness because the harnesses are typically designed to accommodate vehicles with difference placements of the mating socket. This extra length is unsightly and can expose the wiring harness to damage when the trailer is being towed and the wiring harness and associated connectors are attached to the towed vehicle. The connectors are therefore frequently damaged by movement of the trailer, as well as contact with road surface or the frame of the towing vehicle, or the connector may be coated with road film, mud and asphalt or oil while traveling. The dangling connector also detracts from the overall streamlining and positive esthetics appearance of the towing vehicle.

U.S. Pat. No. 4,940,427, dated Jul. 10, 1990, to Linnea H. Pearson, details an "Electrical Trailer Connector Retainer". The retainer is designed for use with an electrical wire connector of the type commonly used to provide electrical connection to a trailer device from the electrical system of a towing vehicle. The device is permanently mounted either on the bumper of the towing vehicle or the tongue of the trailer and permits the electrical wire connector used for transferring electrical power to the trailer from the electrical supply system of the towing vehicle, to be retained when not in use and to be made available for electrical connection when needed. While this device prevents the connector from dragging on the ground, it does not protect the connector from rain, mud, snow, dust and other environmental hazards. This device is permanently fixed directly to the towing vehicle or to the trailer itself, and is not easily removable or relocatable.

U.S. Pat. No. 5,129,828, dated Jul. 14, 1992, to Chauncie L. Bass, details a "Rewind Trailer Light Connector" which includes a rewind housing connected to a vehicle frame or trailer tongue and fitted with a spring-loaded rewind mechanism for storing electrical wiring and the connector or connector receptacle. While this device can provide some protection for the wiring, it does little to protect the actual receptacle from exposure to adverse elements and is also fairly complicated, having numerous moving parts and is relatively expensive. It also is mounted directly to the towing vehicle or to the trailer itself. This device, therefore, is also not easily removable or relocatable. Furthermore, the rewind mechanism itself is exposed to the elements, causing it to fail, negating its protective properties.

U.S. Pat. No. 5,380,209 dated to Jan 10, 1995, to Carroll H. Converse, Jr. (the '209 patent), details a "Trailer Light Connector Enclosure" which discloses a box-like enclosure for containing a trailer light connector and the attached wiring which allows both the trailer connector and wiring to be protected. However, the protective device taught by the '209 patent, like the others detailed above, requires a permanent or semi-permanent attachment to the vehicle or trailer. The '209 device is not easily removed once installed or easily relocated to another trailer and may necessitate the purchase of several devices, one for each trailer or vehicle. In addition, one preferred embodiment taught by the '209 patent is secured to the towing vehicle or the trailer by an adhesive strip. This type of adhesive strip may be prone to failure after extended periods of time and exposure to water and other adverse environmental conditions.

One object of the present invention is to provide a simple, lightweight, and inexpensive system for protecting trailer light connectors from contamination and damage. Another object of the invention is to provide a system that can be attached and detached easily from a number of convenient places on the trailer or towing vehicle, including the wiring harness, and thus easily moved from trailer to trailer as needed.

Further objects and advantages of the present invention will become apparent to those skilled in the art from a consideration of the ensuing description and drawings.

BRIEF SUMMARY OF THE INVENTION

In its preferred embodiment, the protective covering system for trailer connectors consists of a simple apparatus having a flexible body, a holder in the shape of a cylinder or its equivalent attached to the upper part of the body, and a cap. The cap is hinged to the upper part of the body and is made to fit securely over the top of the holder. The holder is made to fit snugly around the connector. In the preferred embodiment, the lower part of the flexible body has a slit that allows the device to be easily attached and detached from the wiring harness. In other embodiments, the systems is attached to the trailer or towing vehicle in a number of places and in a number of ways.

BRIEF DESCRIPTION OF THE DRAWINGS

FIG. 1 shows an embodiment of the protective covering system with the flexible lower portion of the body in a normal state.

FIG. 2 shows an embodiment of the protective covering system with the flexible lower portion of the body being compressed and prepared to receive a trailer light connector and wiring harness.

FIG. 3 shows an alternative embodiment of the protective covering system for trailer light connectors in which the holder is a saddle-shaped enclosure rather than a cylinder.

FIG. 4 shows the protective covering system for trailer light connectors covering a typical trailer light connector.

FIG. 5 shows the protective covering system for trailer light connectors covering a typical trailer light connector and also removably attached to the trailer jackstand adjusting handle.

FIG. 6 shows the preferred embodiment of the protective covering system for trailer light connectors in which the cap is slightly smaller in diameter than the holder and is secured inside the holder in its closed state.

DETAIL DESCRIPTION OF THE INVENTION

Figure 7:
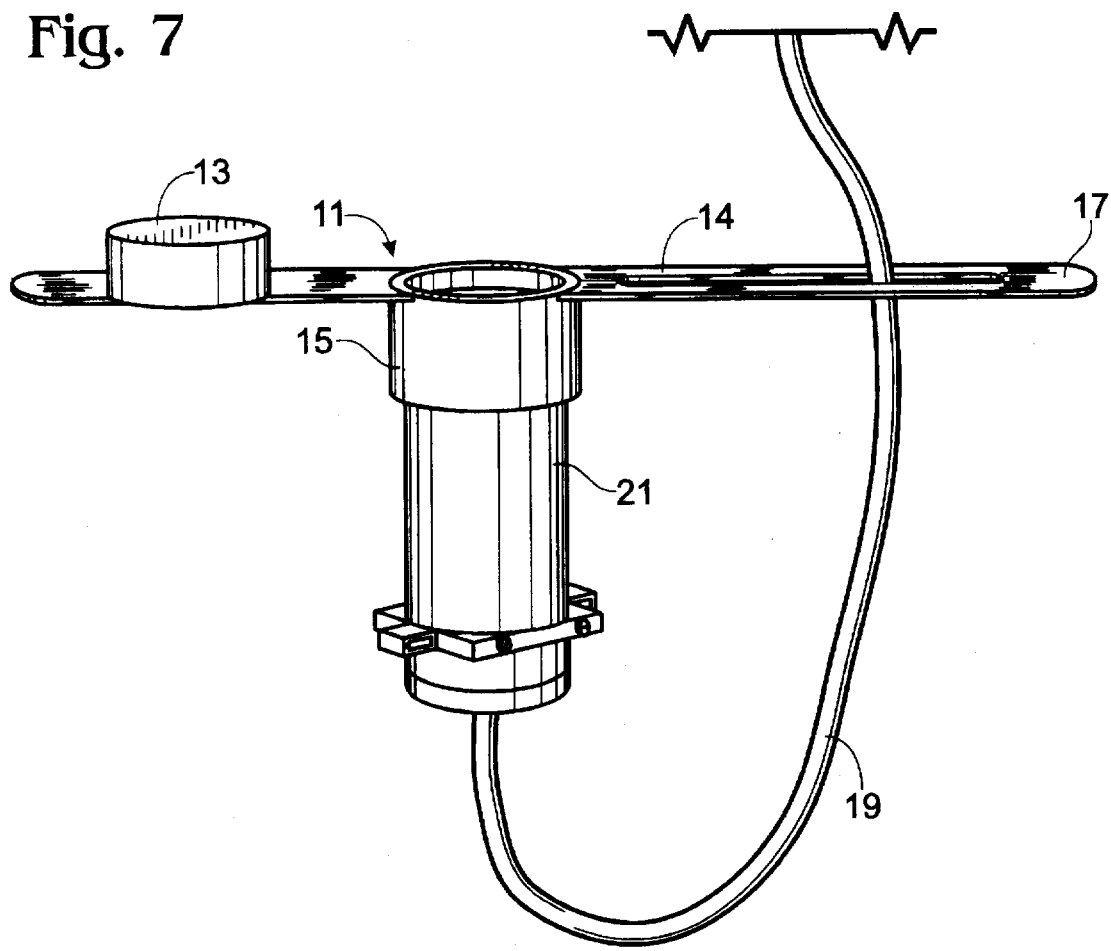
FIG. 7 shows the preferred embodiment of the protective covering system 11 attached to the wiring harness 19.

An embodiment of the invention is illustrated in FIG. 1. The protective covering system 11 has a cap 13, a body 14, and a holder 15 that is a cylinder opened on the end nearest the cap and can be opened or closed on the other end. The body 14 has a flexible lower portion 17 used for attaching the protective covering system 11 to a trailer or towing vehicle.

FIG. 2 shows the flexible lower portion 17 for attaching the protective covering system being compressed to receive a trailer light connector.

FIG. 3 shows the protective covering system 11 with a holder 15 that is saddle-shaped as opposed to cylindrical. In this embodiment, the body 14 and the holder 15 are made from a fairly rigid material. The inner diameter of the holder 15 as shown in FIG. 3 is slightly smaller than the outside diameter of the trailer light connector which it is to protect. In this embodiment, the holder is clamped onto or snapped over the trailer light connector. The cap can be secured over the connector or can be secured directly on the holder.

FIG. 4 shows one embodiment of the invention attached to the wiring harness. The cover 13 is in a closed state and in this embodiment is secure to the connector 21 it is protecting.

FIG. 5 shows the protective covering system attached to both the wiring harness and the jack handle of the trailer.

FIG. 6 shows the preferred embodiment of the protective covering system 11. In this embodiment, the cap 13 is cup shaped and slightly smaller in diameter than the holder, and is made to fit inside the holder 15

FIG. 7 shows the preferred embodiment of the protective covering system 11 attached to the wiring harness 19. In this embodiment, the holder 15 protects the connector 21. In this embodiment the cap 13 is not used protect the connector 21. The function of the cap 13 in this embodiment is to protect the holder when the protective covering system is not in use.

Figure 8:
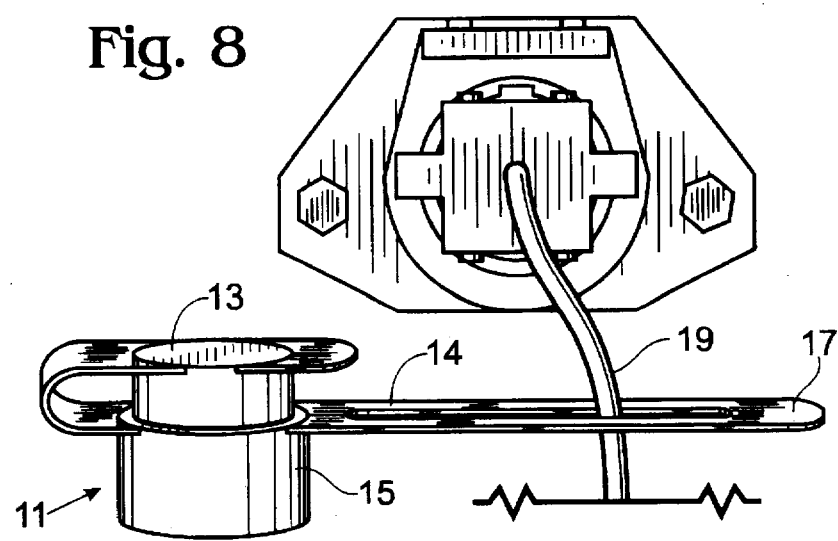
FIG. 8 shows the preferred embodiment of the protective covering system 11 when the protective covering system 11 is not in use.

FIG. 8 shows the preferred embodiment of the protective covering system 11 when the protective covering system 11 is not in use. The cap 13 is closed, covering the holder 11. The slit in the lower portion 17 of the body 14 is used to secure the protective covering system 11 to wiring harness 19 when the connector of the trailer is functionally attached to the receptacle of the towing vehicle.

The operation of the protective covering system for trailer light connectors is shown in FIGS. 3, 4, 5, and 7. Referring to FIGS. 3 and 4 of the drawings, this embodiment shows the protective covering system 11 with a holder 15 that is saddle-shaped as opposed to cylindrical. The trailer light connector 21 and the wiring harness 19 are inserted through the slit in the flexible lower portion 17 as shown in FIG. 4. The holder 15 as shown in FIG. 3 is then clamped onto or snapped over the trailer light connector 21, thereby frictionally embracing the trailer light connector 21 with the saddle-shaped holder 15. The cap 13 can then be secured over the trailer light connector 21.

FIG. 4 shows the protective covering system 11 as used to cover a trailer light connector. The cap 13 is hingeably connected to the body 14 and the holder 15 is shaped like an open cylinder 15. The lower portion of the body tapers down to a flexible portion 17 which has an elongated slit in it to accept the trailer wiring harness 19. The lower flexible portion is compressed and when compressed the slit forms an opening which allows the body of the trailer light connector 21 to pass through the opening. When uncompressed, the wiring is contained between the sidewalls of the slit in the flexible portion as shown in FIG. 4. The trailer light connector 21 is then inserted through the holder 15 of the protective covering system 11 and the cap 13 can then be secured over the electrical contacts of the trailer light connector 21, thereby protecting the contacts from adverse environmental elements.

FIG. 5 shows that the flexible lower portion 17 can also be compressed and used to attach the protective covering system to the towing vehicle or to the trailer frame 23 by slipping the compressed flexible lower portion 17 of the protective covering system 11 over any suitable protruding portion of the trailer or the towing vehicle and then releasing the lower flexible portion 17. In FIG. 5 the protective covering system 11 is attached to the trailer jackstand adjusting handle 25 and can be easily removed.

FIG. 7 shows the preferred embodiment of the invention in use. The protective covering system 11 is secured to the wiring harness 19. The holder 15 is protecting the connector 21. The cap 13 is not in use.

FIG. 8 shows the preferred embodiment of the invention while not in use. The trailer connector is attached to the receptacle of the towing vehicle and thus does not need to be protected. The protective covering system 11 is conveniently secured to the wiring harness 19 while the trailer is being towed. The cap 13 is closed over the holder 15, thus protecting the holder 15 from accumulating dirt and other environmental contaminants while the protective covering system 11 is not in use. When the towing vehicle and trailer reached the desired destination, the protective covering system is conveniently located near the connector. The connector is unplugged from the receptacle, the cap 13 is removed from the holder 15, and the connector is secured in the holder 15, thus protecting the connector.

Those skilled in the art will see that the protective covering system for trailer light connectors can be used to cover and protect trailer light connectors easily and conveniently, can also be installed and removed easily without the necessity of using special connective materials, special tools, or drilling holes in the towing vehicle or the trailer and is particularly well suited to be attached to the wiring harness. This allows the covering system to be transferred from trailer connector to trailer connector without the necessity of purchasing multiple covering systems. The present invention will keep the connector from coming into contact with the ground and the associated mud and grime. The cap protects the holder from accumulating dirt and other environmental contaminants when not in use and in certain embodiments, the cap prevents adverse environmental conditions from damaging the electrical contacts in the connector.

The protective covering system may be constructed from any material that is resistant to exposure to adverse environmental conditions such as mud, snow, dirt, rain, etc. The protective covering system can be formed from various types of plastic, resilient foams, poly-carbonates or other similar materials known to those skilled in the art. The typical injection molding processes of the plastic industry can be used to form or shape the protective covering system. These manufacturing techniques are well known and are not detailed in this specification.

While a preferred form of the invention and several alternative embodiments have been shown in the drawings and described, since variations of the preferred form will be apparent to those skilled in the art, the invention should not be construed as limited to the specific forms shown and described, but instead as set forth in the following claims.

I claim:

1. A protective covering system for a trailer light connector comprising:

a body having an upper and lower portion, the lower portion including an opening whereby the covering system can be readily and repeatedly attached to or detached from a trailer or a towing vehicle, a cap, the cap connected to the upper body portion of the body by a flexible connecting means, a holder, the holder attached to the upper portion of the body, whereby said cap can function as a cover for the holder.

2. A covering system as set forth in claim 1 wherein the flexible connecting means for connecting the cap to the body is a hinging means.

3. A covering system as set forth in claim 1 wherein the holder further comprises two sides, each side attached to the upper portion of the body whereby the connector, when placed in the holder, is tightly engaged.

4. A covering system as set forth in claim 3 wherein each side of the holder is triangularly shaped with the base of the triangle attached to the upper portion of the body.

5. A covering system as set forth in claim 1 wherein the holder is a hollow cylinder.

6. A covering system as set forth in claim 1 wherein the holder is a hollow cylinder, cut on the longitudinal axis whereby connector, when placed in the holder, is tightly engaged.

7. A protective covering system as set forth in claim 1 wherein the opening formed by the lower portion of the body is an elongated slit.

8. A protective covering system as set forth in claim 1 wherein the body is formed from a flexible material.

9. A protective covering system as set forth in claim 1 wherein the body is formed from a rigid material.

10. A protective covering system as set forth in claim 1 wherein said holder has two ends, the end nearest said cap is open, the end furthest from the cap is enclosed, the cap is of a smaller diameter than said holder whereby holder is closed by inserting the cap inside the holder.

11. An enhanced trailer comprising a trailer and the protective covering system of claim 1 wherein the covering system is attached to the trailer by placing a suitable portion of the trailer through the opening formed by lower portion of the body.

* * * * *